United States Patent Office 3,138,971
Patented June 30, 1964

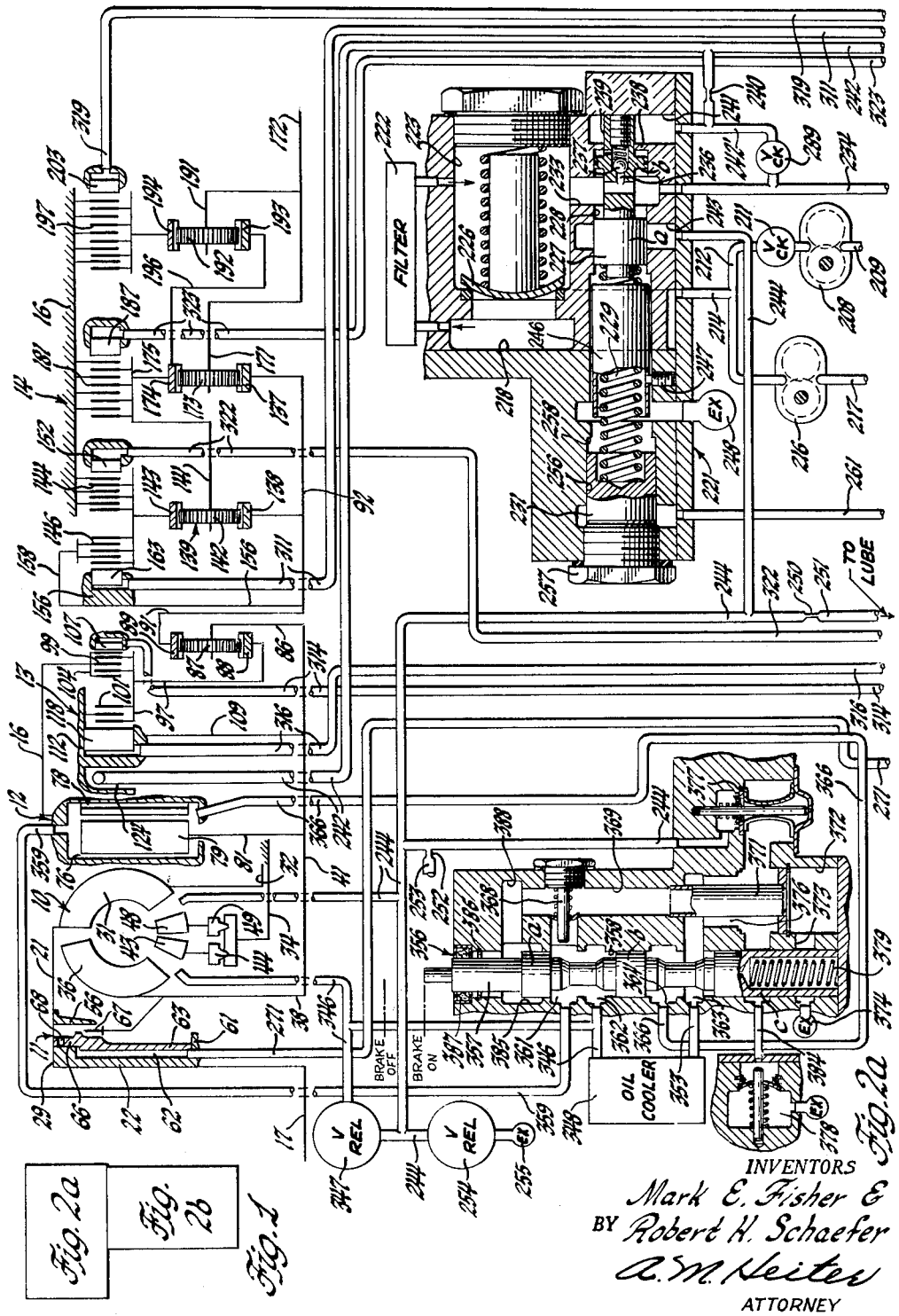

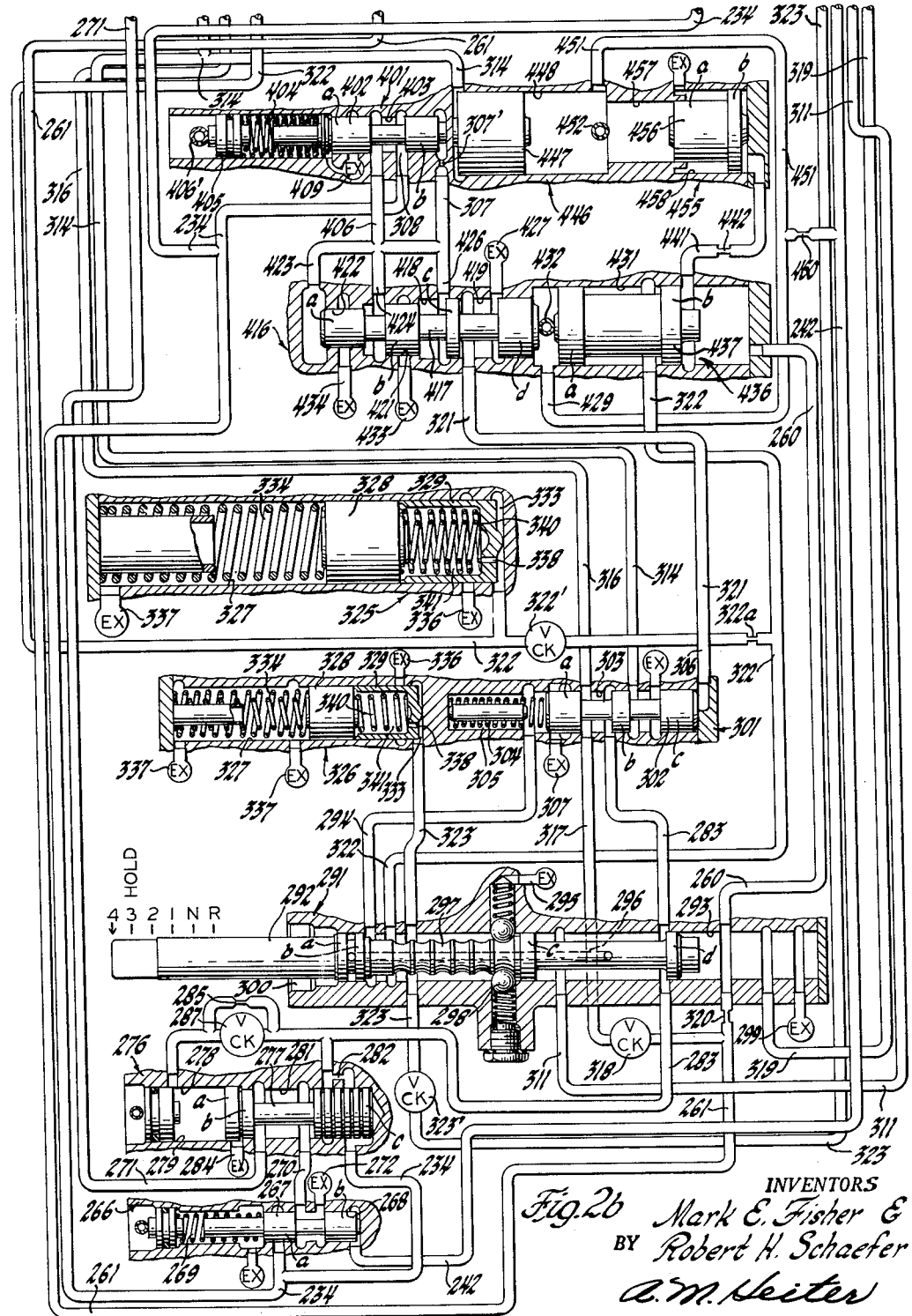

3,138,971
TRANSMISSION
Mark E. Fisher, Carmel, and Robert H. Schaefer, Westfield, Ind., assignors to General Motors Corporation, Detroit, Mich., a corporation of Delaware
Filed Feb. 20, 1961, Ser. No. 90,457
19 Claims. (Cl. 74—752)

This invention relates to a transmission and more particularly to an automatic multiratio transmission.

This transmission includes in the drive train a torque converter and a lock-up clutch which may be alternately employed to provide torque multiplication or a direct drive, in combination with a multiratio gear unit providing six forward ratios and two reverse ratios. The torque converter provides additional torque multiplication and reduces shock loads during starting, high performance driving, and ratio changes in the multiratio transmission unit. The semi-automatic control system provides, on the selection of a drive ratio, automatic controls to engage the lock-up clutch when the vehicle reaches a certain preselected cruising speed, and thereafter to disengage the lock-up clutch during ratio changes. The main line pressure is regulated by a regulator valve responsive to governor pressure and a signal pressure effective in first forward and first reverse ratios and controlled by a manual valve and a governor controlled shift valve to provide six forward ratios and two reverse ratios. A hydrodynamic brake driven by the converter output shaft also provides effective downhill braking.

An object of the invention is to provide in an automatic transmission having a torque converter, a lock-up clutch, a two ratio gear unit and a three ratio gear unit, an automatic control system effective to provide six forward ratios and two reverse ratios and to engage the lock-up clutch automatically during certain forward ratios and disengage the lock-up clutch during certain ratio changes.

Another object of the invention is to provide in a multiratio semi-automatic transmission a manual control effective to provide a plurality of ranges of ratios and a speed controlled shift valve operative in response to a variable governor pressure to automatically select a plurality of ratios in each range.

Another object of the invention is to provide in an automatic transmission having a plurality of ratios, a shift valve having a plurality of unbalanced areas and controlling the supply of fluid to actuate the automatic transmission, a controlled biasing pressure acting on said unbalanced areas, and a governor acting on the shift valve to move the valve from a downshift position to an upshift position cutting off the biasing pressure to at least one unbalanced area during upshifting.

Another object of the invention is to provide in an automatic transmission a shift valve, a governor providing a pressure to actuate said shift valve, and accumulators actuated by changes in ratio to vary the governor pressure during shifting.

Another object of the invention is to provide in a transmission having first and second multiratio drive units, first and second shift valves to control the drive units, a governor providing a pressure to actuate a shift valve for one unit, and an accumulator assembly operative in response to a shift in the other of the drive units to control the governor pressure to insure the proper shift in the one unit.

These and other objects of the invention will be more apparent from the following description and drawings of the preferred embodiment.

FIGURES 2a and 2b when arranged in accordance with FIGURE 1 show the transmission assembly and the control system therefor.

The transmission drive train shown diagrammatically in FIGURE 2a includes a torque converter 10, a lock-up clutch 11, a hydrodynamic brake 12, a two speed splitter gear unit 13, and a three speed and reverse main gear unit 14, all located in the transmission housing 16 and is shown in detail in the Robert M. Tuck and Mark E. Fisher application S.N. 657,432 filed May 6, 1957, now Patent No. 2,978,928. Referring to FIGURE 2a the engine shaft 17 rotatably mounted in suitable bearings is connected to rotatably drive the torque converter housing 21 which has a rear curved portion to which the converter pump blades 31 are attached and a hub 32 which may be supported on ground sleeve 34 secured to the transmission housing 16. The torque converter pump blades 31 circulate the fluid counterclockwise to the turbine blades 36 which drive via an output hub 38 the converter output shaft 41. When the fluid leaves the turbine blades 36 it is redirected during high torque multiplication by the blades of the first stator 43 which is connected by a one-way clutch 44 to the ground sleeve 34. The fluid is, during all torque multiplication, redirected by the blades of the second stator element 48 which is connected by one-way clutch 49 to the ground sleeve 34.

The lockup clutch 11 has a fixed plate 56 rotatably and axially secured adjacent the front wall 22 of housing 21. The front wall 22 also has between the outer cylindrical portion 29 and an inner cylindrical portion 61, an annular cylinder 62 for the lockup clutch piston 63. The hydraulic pressure in the converter chamber, without the assistance of a spring, returns the piston 63. The piston 63 has a pressure plate portion 66 which engages the driven clutch plate 67 between itself and the fixed plate 56 to engage the lockup clutch. The driven plate 67 is apertured to permit fluid passage therethrough and suitably connected to the output hub 38 and output shaft 41. At a near stall the pressure in cylinder 62 may rise higher due to centrifugal pressure head than the pressure in the converter chamber which at stall has a low centrifugal pressure head to tend to engage the clutch. To avoid this, piston 63 has a restricted bleed hole 68 at the outer diameter to permit exhaust of fluid from the cylinder to the converter chamber to reduce the pressure in cylinder 62 by equalizing pressure at the bleed when the supply of control fluid is stopped to permit the pressure in the converter chamber to retract and hold the piston for disengagement of the lockup clutch. The bleed is not large enough to interfere with the proper buildup of pressure in cylinder 62 on the supply of control fluid to engage the clutch or may be placed in a position to be closed by the clutch driven plate when the clutch is engaged.

The input pump 216 and any other engine driven accessories may be driven by gearing connected to hub 32 of the torque converter housing 21.

The hydrodynamic brake unit 12 is located between the torque converter 10 and the front or two speed splitter gear unit 13 in a chamber 76 provided in the transmission housing 16. An annular series of radial vanes 78 which provide the stator element of the hydrodynamic brake are located in brake chamber 76 and fixed to housing 16. The rotor element of the hydrodynamic brake consists of an annular series of radial vanes 79 mounted on a hub 81 secured to the torque converter output shaft 41.

The converter output shaft 41 drives the two speed gear unit 13. This single planetary type gear unit has a carrier 86 splined to the shaft 41 to provide the input element for this gear unit. The carrier has a plurality of planetary pinions 87 which mesh with a sun gear 88 and a ring gear 89 which is suitably connected by a hub 91 to the intermediate shaft 92 or output member of this gear unit. The sun gear 88 is connected to the control hub 97 which may be stopped by the overdrive ratio change device or brake 99 to provide an overdrive ratio or connected to the shaft 41 by a direct drive clutch 101 and hub 109 to provide direct drive in this gear unit. The brake 99 has conventional alternate fixed plates splined to the housing 16 and moving plates splined to the hub 97, located between a fixed abutment 104 formed as a portion of the housing 16 and the annular piston of motor 107 formed in a portion of the housing 16. Since the piston engages a non-rotatable clutch plate it is not necessary to provide the usual stop member such as a pin to prevent rotation of the piston and the other ground clutch pistons described below. A return spring, not shown, returns the piston to the released position. The direct drive clutch 101 is mounted on hub 109 splined to shaft 41 and has driven plates splined to the hub 97 and drive plates splined to an axial flange portion 112 of the hub 109, located between a fixed abutment and the annular piston 118 on the hub 109. The piston of motor 113 is returned by a retraction spring not shown.

The pitot governor 124 has an annular chamber formed by a part of flange 112 which rotates with the hub 109 and shaft 41. Fluid is supplied to the chamber by line 253, which has a terminal end located to spray fluid through the opened internal side of the chamber. The fluid is retained in the chamber by centrifugal force and rotates with the chamber toward the open end of the Pitot tube to provide a governor pressure in line 242 proportional to the speed of shaft 41.

The intermediate shaft 92 connects the front unit 13 to the rear or three speed unit 14, and drives a first sun gear 137 and the second sun gear 138 of the compound planetary three speed unit 14. The second planetary gear set 139 has a carrier 141 carrying a plurality of planetary pinions 142 which mesh with the second sun gear 138 and the ring gear 143. The ring gear 143 is controlled by a ratio change device or brake 144 to provide intermediate ratio and by a direct drive clutch 146 to provide direct or high ratio in this unit. The clutch 144 has alternate rotating plates splined to the ring gear 143 and intermediate fixed plates splined to the housing 16 which are located between a fixed abutment secured to the housing and an annular piston of motor 152 formed in a portion of the housing 16. Retraction springs, though not shown, are employed to return the piston to the released position.

The direct drive clutch 146 is located in a hub 156 splined to the intermediate shaft 92. This clutch has a set of planes having alternate plates splined to the ring gear 143 and intermediate plates splined to the cylindrical flange 158 formed as an extension at the outer diameter of the hub 156. The set of plates is located between a fixed abutment secured to the flange 158 and the piston of motor 163. A retraction spring not shown returns the piston of motor 163.

The first planetary gear set of the three speed compound planetary unit 14 has a carrier 171 connected to the output shaft 172 and carries a plurality of planetary pinions 173 meshing with the sun gear 137 and the ring gear 174. The ring gear is connected by hub 175 to the carrier 141 which is rotatably supported by the gearing or suitable thrust bearing on the intermediate shaft 92. The ring gear 174 is retarded to provide low ratio in the three speed unit by a brake 181 which has a set of plates having alternate plates splined to hub 175 of ring gear 174 and intermediate plates splined to housing 16. This set of plates is located between a fixed abutment and a piston of motor 187.

The reverse gear unit has a carrier 191 fixed to the output shaft 172 and carries planetary pinions 192 meshing with the sun gear 193 and the ring gear 194. The sun gear 193 has a hub 196 extending radially outward and having a connection to the ring gear 174 which provides a unitary assembly consisting of the sun gear 193, the ring gear 174 and the carrier 141. The ring gear 194 is stopped to provide reverse by the reverse brake 197 which has a set of plates with alternate plates splined to the ring gear 194 and intermediate plates splined to housing 16. The plates are located between a fixed abutment and a piston of motor 203.

The front or two speed unit provides a direct drive and overdrive which when used in combination with each of the three forward ratios and reverse provided in the rear or three speed unit 14 produces a transmission providing six forward speeds and two reverse ratios. In the front unit 13 the direct drive is provided by engaging the direct drive clutch 101 which connects the converter output shaft 41 and the sun gear 88 together to lock up the planetary gear unit to provide direct drive which is the lower ratio. An overdrive ratio is provided by engaging the brake 99 which holds the sun gear stationary so that the input carrier 86 drives the output ring gear 89 at an overdrive ratio. In the rear unit when the low brake 181 is engaged to hold the ring gear 174 the input sun gear 137 drives the planetary carrier 171 and output shaft 172 at a low ratio. When the intermediate brake 144 is engaged the ring gear 143 is held stationary so that the intermediate shaft 92 and sun gear 138 drive the planetary carrier 141 forwardly at a reduced speed, and this carrier drives the ring gear 174 which in combination with the intermediate shaft 92 driving sun gear 137 rotates the carrier 171 at an intermediate ratio. High ratio or direct drive in the rear unit 14 is provided by engaging clutch 146 connects the intermediate shaft 92 to the ring gear 143 to provide a direct drive. Reverse drive is provided by engaging the clutch 197 to hold the ring gear 194. Then the sun gear 137 drives the ring gear 174 reversely since the carrier is stationary or moving reversely to impart a reverse drive to the sun gear 193 which drives the carrier 191 and output shaft 172 at a reduced reverse ratio. It will be appreciated that only one clutch is applied in each unit to provide one drive ratio in each unit and that the other clutches must all be disengaged. This gearing on the application of one clutch in the rear unit to provide either high, intermediate, low or reverse ratios and one clutch in the front unit to provide either direct drive or overdrive provides six forward ratios and two reverse ratios.

*Hydraulic Controls*

The hydraulic control system for this transmission provides for manual selection of four forward ranges and one reverse range. The six forward ratios are obtained by employing in combination with direct drive in the two speed unit, low, intermediate, and high ratio in the three speed unit for 1st, 3rd and 5th ratio and by employing overdrive in the two speed unit in combination with low, intermediate and high in the three speed unit for 2nd, 4th and 6th ratio. The two reverse ratios are obtained by employing in combination with reverse in the three speed unit either direct drive or overdrive in the two speed unit. Additional automatic controls are provided in order to shift between 1st and 2nd ratio in 1st range, between 3rd and 4th ratio in 2nd range, between 5th and 6th ratio in 4th range and to hold 5th ratio in 3rd range and to obtain speed responsive engagement of the direct drive clutch while operating and automatic disengagement during a ratio change interval between these ratios. The hydrodynamic brake is controlled by a manual valve to apply and release the brake which automatically limits the pressure in the hydrodynamic brake chamber and thus the braking torque of the brake.

The fluid for this control system is supplied by an output pump 208 driven by the output shaft 172 which draws fluid from the sump line 209 and delivers the fluid through check valve 211 to branch 212 of supply line 214 and by an input driven pump 216 driven by hub 32 which supplies fluid from sump line 217 to supply line 214. The supply line 214 is connected to a chamber 218 in the body of the regulator valve 221. Fluid from the chamber 218 normally flows through the filter 222 to the inlet chamber 223 but if there is an excessive pressure drop through the filter the fluid will pass directly from the supply chamber 218 to the inlet chamber 223 through the relief valve 226.

Main Regulator Valve

The regulator valve element 227 has lands *a* and *b* of equal diameter located in the bore 228. The valve element 227 is normally biased to the position shown by a spring 229 between the valve element and a movable control abutment 231 described below. The supply line 214 is always connected through the filter 222 or relief valve 226 and chamber 223 to port 233 to continuously supply main line 234 and the space between lands *a* and *b*. This space is always connected to passage 236 having a check valve 237 therein permitting flow of fluid from the port 233 to the bore 228 between the land *b* and the end wall 238 of the bore 228. The fluid in the bore acts on the unbalanced area of land *b* so that the valve regulates the pressure in the main line. The check valve 237 in cooperation with a small clearance between the land *b* and the bore 228 damps the action of the regulator valves more fully explained in application S.N. 551,068, filed December 5, 1955, by Ulysses A. Breting and Robert M. Tuck, now Patent No. 3,033,333. A reduced portion 239 of the valve element 227 extends through an aperture in wall 238 into a chamber 241 communicating with the pitot governor line 242 so that the governor pressure acts on the valve element to decrease main line pressure with increasing governor pressure. As the main line pressure in line 234 increases the valve element 227 will be moved to the left to exhaust fluid to port 243 which is connected by converter line 244 to supply the torque converter.

The converter line 244 in addition to supplying fluid to the torque converter also supplies fluid through orifice 250 (FIGURE 2a) to the lubrication line 251 and through orifice 252 to the pitot governor feed 253 to supply the chamber of pitot governor 124. The converter line 244 is also connected to a safety valve 254 which limits unusual excess pressure in the converter and exhausts the excess fluid through the exhaust 255.

The movement of valve element 227 is limited by a sleeve 246 fixed in bore 228 by a screw 247 fixed in the valve body which extends into a hole in the sleeve to prevent valve element portion 239 moving out of the aperture in wall 238 which would interconnect main line 234 and governor line 242. The exhaust 248 always connects the space between abutment 231 and the valve element 227 to exhaust. The control abutment 231 of regulator valve 221 is located within a large bore portion 256 of the bore 228 for limited movement between end plug 257 and shoulder 258 and is moved from the position shown by fluid supplied from the signal line 261. When the transmission is operating in the first forward ratio, neutral, and first reverse ratio, the control abutment 231 is moved from the position shown to abut shoulder 258 to increase the spring force on the valve element 227 to provide pressure regulation at a higher level. The main line 234 supplies regulated pressure to the lockup shift valve 266 and the flow valve 276.

Lockup Shift Valve

The lockup shift valve 266 has a valve element 267 having lands *a* and *b* of uniform diameter located in the bore 268 in the valve body. The bore is closed at both ends and a spring 269 located in one end of the bore urges the valve to the closed position shown in which the land *a* blocks the main line 234 and connects lockup clutch supply line 270 to exhaust 272. The governor line 242 supplies fluid at a pressure proportionate to the output speed of the torque converter to the other end of the bore 268 where the fluid acts on land *b* of valve element 267 to move the valve to the lockup position in which line 234 is connected between the lands *a* and *b* to the lockup clutch supply line 270 and the land *b* closes the exhaust 272.

Flow Valve

Main line 234 is also connected to the flow valve 276 which has a valve element 277 having land *a* of large diameter and a narrow land *b* of small diameter closely adjacent land *a* and a second land *c* of the same small diameter substantially spaced from the other lands. The valve element 277 is slidably mounted in a bore 278 having a large diameter portion fitting land *a* and small diameter portion fitting lands *b* and *c*. The overall length of the lands *b* and *c* including the space between is substantially equal to the length of the small bore portion 281. The width of land *b* is substantially equal to the width of port 284. The main line 234 is connected freely around land *c* and through an orifice 282 to the ratio change line 283. The main line 234 is also connected to the end of valve bore 281 to act on the land *c* to move the valve to the left to the exhaust position in which lockup clutch line 271 is connected to exhaust 284 venting line 271 to disengage the lockup clutch. To prevent fluid lock during this movement of the valve the space between lands *a* and *b* is connected to exhaust 284. In the normal position shown the land *b* of valve 277 blocks the exhaust 284 and lockup supply line 270 is connected to lockup clutch line 271 to engage the lockup clutch if the lockup shift valve 266 has upshifted. The valve 277 is moved to the exhaust position whenever there is flow from the main line 234 to the ratio change line 283 through orifice 282. This occurs during each ratio change when a fluid motor is filled to engage a clutch. When the clutch engagement is completed the flow through orifice 282 ceases and the pressure in lines 283 and 234 equalizes since there is no flow through orifice 282. Fluid is also supplied through the orifice 285 in the check valve 287 to fill the bore 279 so the same pressure acts on both ends of the valve 277. Since the land *a* is larger than the land *c* the valve element will be moved to the right or closed position. The orifice 285 delays the flow of fluid from line 283 to the valve bore 279 to delay return movement of valve 277, sufficiently, so that the ratio change clutch or brake is fully engaged to establish a new ratio before the lockup clutch is again engaged. The check valve 287 permits rapid exhaust of the bore portion 279 as the flow valve moves from the closed to the exhaust position so that the lockup clutch will be disengaged quickly as the shift is initiated so that during the entire period of the shift the converter will be effective to absorb any shift load shocks.

The check valve 289 (FIGURE 2a) located between the main line 234 and the governor line 242 prevents governor pressure acting on regulator valve 221 from exceeding the main line pressure by exhausting governor fluid to the main line when governor pressure exceeds main line pressure. This is effective as a safety measure to prevent excessive pitot governor pressure at high speeds and to limit the reduction of main line pressure.

Manual Selector Valve

The ratio change line 283 supplies main line pressure to the manual valve 291 which has a valve element 292 having lands *a*, *b*, *c* and *d* of uniform diameter located in a bore 293.

Valve element 292 has a central passage 296 connecting the space between the lands *c* and *d* with the space between the lands *a* and *b* and a plurality of grooves 297 cooperating with a ball detent mechanism 298 to resiliently position the valve in each of the four forward ratio positions, neutral and one reverse position.

The manual selector valve element 292 in the fourth range position shown connects main line pressure from the ratio supply 283 between the lands *c* and *d* to the high clutch line 311. On the shift to the third range hold position, this connection is maintained and in addition pressure is supplied through the bore 296 in valve element 292 between lands a and d to the third hold signal line 294. In the second range position these lines are connected to exhaust and main line pressure from line 283 is connected by bore 296 spaced between lands a and d and intermediate clutch line 322. In the low range position, pressure from line 283 is similarly connected to low clutch line 323 and to the signal lines 260 and 261. In neutral, pressure is only supplied to the signal lines 260–261. In reverse, pressure is similarly supplied to the signal lines 260 and 261 and to the reverse clutch line 319. The lines not supplied as enumerated above are connected to exhausts 299, 295 or 300.

Splitter Shift Relay Valve

The splitter shift relay valve 301 has a valve element 302 having lands a, b and c of equal diameter located in a bore 303 and maintained in the downshift position shown by a spring 304 located in a closed chamber 305. In the downshift position shown, valve 301 connects the ratio supply line 283, which is not controlled by the manual selector valve 291 and thus supplies fluid at all times, between the lands a and b to the low ratio or direct drive clutch line 316 for the splitter unit. The overdrive or high clutch line 314 for the splitter unit is connected between lands b and c to exhaust 306. When the governor signal pressure is supplied by line 321 at the end of bore 303 to act on land c to move the valve against the biasing force of spring 304 to the upshift position, the ratio supply line 283 is connected to the high ratio line 314 and the low ratio line 316 is connected to exhaust 307. When the manual selector valve 291 is in the third hold range, it supplies fluid to line 294 which is connected to the spring chamber 305 of valve 301 to positively position this valve in the downshift position.

The boost signal line 261 though supplied with main line pressure, in first, neutral and reverse ranges, is only effective to boost main line pressure in first ratio, neutral range and first ratio reverse range, because the pressure supplied from the manual selector valve 291 to line 261 must pass through orifice 320 and line 261 is vented, whenever the high ratio in the splitter unit is engaged, through the one-way check valve 318 which permits flow only from line 261 to line 317 which, when the splitter unit is in high ratio is connected to exhaust 307 by the splitter shift valve 301. Thus whenever shift valve 301 is upshifted, line 261 is connected to exhaust 307. When the splitter shift valve is in the downshift position shown, supplying pressure to line 316 to engage the low ratio in the splitter unit, pressure is also supplied to line 317 which closes check valve 318 blocking exhaust from line 261 to maintain the pressure in line 261 supplied by manual valve 291.

Ratio Regulator Valves

The intermediate clutch line 322 and low clutch line 323 are controlled respectively by trimmer valves 325 and 326 to provide initial low pressure for the initial stage of clutch application and a gradual increase in pressure to a final high pressure equal to main line pressure. Since these valves have the same structure and function, the following description applies to both. The trimmer valves 325 and 326 have a bore 327, a plug 328 and a valve element 329 located in the bore. The clutch line, such as line 322 or 323, is connected to a chamber 333 at the right end of the bore 327 and clutch fluid acts on the end of valve 329 to urge the valve and plug 328 against the dual spring 334 to move the valve from the closed position shown to an open position connecting the clutch line to exhaust 336 to reduce the line pressure to the value regulated by the springs 334 at the extended length shown. The bore 327 is provided with an exhaust 337 to prevent the accumulation of oil in the bore interferring with the operation of the valve. The intermediate clutch line 322 is also connected via chamber 333 through an orifice 338 in the valve 329 to the chamber 341 in valve 329 where it, after a timed interval required for flow through orifice 338 to fill chamber 341, acts on the plug 328 and valve 329 to balance the fluid forces permitting springs 340 to separate the plug and valve to compress a spring 334 and increase the spring force acting on valve 329 and the pressure in the clutch line. When the clutch line is exhausted, the fluid acting on the valve element 329 is exhausted and strong spring 334 moves the plug and valve to the position shown forcing fluid through the orifice 338 to position the valve 325 or 326 for a subsequent clutch application.

The converter supply line 244 supplies fluid from the pressure regulator valve 221 to the torque converted. Then the fluid flows from the converter to outlet line 346 to the converter outlet valve 347 and to the cooler 348.

A relief valve 347 is placed between converter inlet line 244 and converter outlet line 346 and is operative to open in response to a low pressure, i.e., 3 p.s.i. to permit flow from the converter inlet line 244 to the converter outlet line 346 when a pressure differential of more than 3 p.s.i. exists. During the torque multiplication phase of operation of the converter the outlet pressure is sufficiently high compared to the inlet pressure to close valve 347 and insure fluid flow through the converter. During the coupling phase, due to the reduction of pumping action, the outlet pressure is reduced permitting valve 347 to open to bypass fluid directly from the inlet line to the outlet line.

The cooler outlet line 353 supplies fluid from the torque converter to the hydrodynamic brake when the brake control valve 356 is in the brake-on position shown in FIGURE 2a. The brake control valve 356 has a valve element 357 having lands a, b and c of equal diameter located in the bore 358 in the valve body. With the brake valve 356 in the brake-on position shown, the brake outlet line 359 is connected to annular port 361 between the lands a and b to the cooler inlet port 362 and line 346 to cooler 348. The fluid from the cooler passes through line 353 to cooler outlet port 363 between the lands b and c to the brake inlet port 364 and line 366 to supply fluid to the brake chamber 76 to apply the hydrodynamic brake. The brake outlet port 361 is also connected to a pressure relief valve 368. Since the torque absorbed by a hydrodynamic brake, having a central inlet and an outer outlet, is proportionate to the pressure in brake outlet line 359, the valve 368 limits the torque absorbed by the brake by relieving excess pressure by venting the brake outlet flow from port 361 to a drain passage 369 which is connected by the tube 371, chamber 372, and passage 373 extending around land c of valve zone 357 to exhaust 374. The cooler outlet port 363 is connected by passage 376 concentric with tube 371 to a low pressure check valve 377, i.e., 2 p.s.i. which regulates the brake inlet pressure and opens at 2 p.s.i. to supply the converter and lube lines. When the pressure in the cooler outlet port 363 raises above a predetermined value, i.e., 22.5 p.s.i., relief valve 378 opens and fluid is exhausted through passage 384 connected to chamber 376 and port 363.

When the valve element 357 is moved by biasing spring toward the brake-off position, land a first uncovers the apex of triangular port 385 and then increasing areas of port 385 to provide a variable orifice connection from brake outlet line 359 to vent port 388. This variable orifice control provides auto-regulation of the torque absorbed by the brake at intermediate values since an increase in the torque absorbed will increase the outlet pressure and flow through the orifice to reduce the volume of fluid in the brake chamber, the outlet pressure and flow and the torque absorbed and a decrease in the torque absorbed will similarly increase the torque absorbed, as explained in detail in the copending application Serial No. 555,847, filed December 28, 1955, by Howard W. Christenson et al., and now matured into Patent No. 2,864,473. Seal 387 closes the upper opened end of the bore 358.

There is a small clearance between the lands of valve 357 and bore 358 so that the fluid in the ends of the bore does not block movement of valve 357. When the valve element 357 is in the brake-off position with land a engaging stop ring 386, the brake outlet line 359 and port 361 are connected between the lands a and b without restriction to the vent port 388 which is connected via passage 369, tube 371, chamber 372 and passage 373 to exhaust 374 to fully evacuate the brake chamber. The land b blocks the connection between brake outlet port 361 and bore 358 so that the brake outlet line 359 is not connected to the cooler and also prevents oil from the cooler inlet line 352 entering the valve bore 358. The land c also blocks the connection between the cooler outlet port 363 and the brake inlet port 364 and thus stops the supply of fluid to the brake inlet line 366. Since the cooler outlet port 363 extends around the land c the cooler outlet line 353 remains connected to the passage 376 and via check valve 277 to converter inlet line 244 and relief valve 378 which will limit excessive converter outlet pressure by exhausting excess fluid to exhaust as explained above.

Biasing Pressure Regulator Valve

The main line 234 is connected to a biasing pressure regulator valve 401 which provides a constant pressure for biasing the splitter signal valve 416. Valve 401 has a valve element 402 having lands a and b of equal diameter located in a bore 403 and biased by spring 404 to the open position shown in FIGURE 2b. In this position, main line 234 is connected between lands a and b to biasing pressure line 406 which has a branch 307 having an orifice 307' for damping valve action connected to the end of bore 403 to act on the unbalanced area of land b to urge valve element 402 against spring 404 to first close the inlet port 308 of line 234 and then open exhaust 409 to regulate the pressure in biasing line 406 at a constant value regardless of main line pressure variations under the control of the main regulator valve 221. The spring 404 may abut a piston type closure 405 having an annular groove and O-ring to seal the bore. The closure abuts a stop pin 406'. Exhaust 409 has a branch connected to the spring chamber to vent it at all times.

Splitter Shift Signal Valve

The splitter shift signal valve 416 (FIGURE 2b) has a valve element 417 having lands a, b, c and d. Land a has the smallest diameter and land b and c are progressively larger to provide a first unbalanced area at the end of land a, second unbalanced area between lands a and b and a third unbalanced area between lands b and c. Lands c and d are the same size. The bore 418 has a large diameter portion 419 for the lands c and d and intermediate size portion 421 for the land b and a small diameter portion 422 for the land a. A biasing pressure regulator valve 401 supplies a biasing pressure to line 406 which is connected by branch 423 to the end of bore 422 to act on land a and via branch 424 to the bore 421 to act on the unbalanced area between lands a and b, and via branch 426 to bore 419 to act on the unbalanced area between lands b and c. Each of these biasing pressures act in a downshift direction to move the valve to the position shown where the shift signal pressure line 321 is connected to exhaust 427. The governor line 242 supplies pressure through the orifice 450 to a branch line 429 to a bore 431 to act on the end of the land d. In the downshift position valve element 417 is maintained by the biasing pressure acting on the three unbalanced areas against the stop pin 432 as shown in FIGURE 2b. When the speed increases sufficiently to increase the governor pressure to a value to overcome the biasing force, the governor pressure moves the valve element 417 to the left or in an upshift direction. As the valve element 417 moves in an upshift direction, land d simultaneously closes exhaust 427, connects biasing pressure branch 426 to the shift signal line 321 and blocks fluid flow from branch line 426 to the space between the lands b and c and connects this space to exhaust 433 to vent this space between lands b and c and discontinue the portion of the biasing pressure acting on valve 417 between lands b and c to provide hysteresis. On further upshifting movement of valve element 417, the land b blocks flow from branch 424 to the space between lands a and b and vents this space to exhaust 434 to discontinue the biasing pressure acting on the unbalanced area between the lands a and b. Thus the biasing force is reduced during upshift by reducing the area on which the biasing pressure acts and at the termination of the upshift the biasing pressure only acts via branch 423 on the end of land a.

Pitot Valves

The pitot control valve 436 has a valve element 437 having lands a and b of equal diameter located in the bore 431. When pressure is supplied in low range, neutral and reverse range to the booster line 260, this pressure is supplied to the right end of the bore 431 to act on the land b of valve element 437 to move the valve to the position shown abutting the stop pin 432, connecting boost line 260 to the relay line 441 having orifice 442 and blocking intermediate clutch line 322 between the lands a and b. When booster line 260 is vented at the manual valve 291, the governor pressure supplied by branch 429 to the space between the splitter shift signal valve 416 and land a of the pitot control valve 437, this valve is moved to the right to disconnect the connection between booster line 260 and relay line 441 and establish a connection between intermediate clutch line 322 and relay line 441.

The splitter pitot valve or accumulator 446 has a valve element 447 located in a bore 448. Governor pressure supplied by branch line 451 normally holds valve element 447 in the charged position shown at the closed end of bore 448. When pressure is supplied via line 314 to engage the splitter high clutch, the branch 314, connected to the left and closed end of bore 448, acts on the valve element 447 to move the valve to the right until it abuts stop pin 452, to discharge the valve, which forces governor pressure back through line 451 to momentarily increase the governor pressure.

The pitot valve or accumulator 455 has a valve element 456 having a small land a located in small bore 457 and a large land b located in large bore 458 and is normally held by governor pressure supplied by branch governor line 451 in the charged position shown. When fluid is supplied to the relay line 441 by pitot control valve 436, the main line pressure moves the valve 456 to the left to the discharged position abutting stop pin 452 and forces a volume of fluid into governor line via branch 451 to momentarily increase the governor pressure. Valve 456 has a differential area to increase the rise in governor pressure, though the time duration will be less for the same valve travel.

It should be noted that the governor line branch 451 connected to the pitot valves 446 and 455 and the governor line branch 429 connected to act on the splitter shift signal valve 416 and the pitot control valve 436 are freely interconnected and both are connected through an orifice 450 to the main pitot governor line 242. This rapid discharge movement of each pitot valve is temporarily operative to increase the governor pressure in branch lines 451 and particularly 429 acting on the splitter shift signal valve 416 since orifice 450 prevents free escape of the fluid. Thus the rate of supply of fluid and the pressure supplied to the pitot accumulator valves to move them in a discharge direction and the size of orifice 450 controls the degree and extent of time of the governor pressure increase acting on the splitter shift signal valve 416. The rate of supply of fluid to the pitot valves must tend to provide a governor fluid discharge therefrom larger than flow through orifice 450 to increase governor pressure in lines 429 and 451. An increase in the pressure of the actuator fluid supplied to the pitot valves will increase the rise in governor pressure.

It will then be appreciated that a smaller orifice 450 will increase the duration of the pressure increase. During charging of the pitot valves, the governor pressure may be reduced if the actuating pressure is vented rapidly enough so that the charging rate of the pitot accumulator valves is faster at a lower pressure than the flow rate through orifice 450. Thus governor pressure in lines 429 and 451 is reduced to the value necessary to move the valve toward discharge at a faster charging rate than the flow rate through orifice 450. It will thus be seen that the relative restriction of the vent line passage for the actuating fluid from each pitot valve and the restriction of governor fluid flow thereto, particularly orifice 450, determine the governor pressure reduction.

*Operation*

When the vehicle engine is started, pressure is supplied by the front pump 216, and when the vehicle moves also by the rear pump 208 to the main pressure regulator valve 221, which regulates the pressure of the main line 234 at a constant pressure varied in accordance with the governor pressure supplied by governor line 242 via orifice 240 to the branch 242' to act on the right end of the regulator valve to provide a main line pressure decreasing proportionally with increasing governor pressure. When the governor pressure increases to the same value as main line pressure, the governor pressure in branch 242' will be exhausted through check valve 289 to main line 234 to limit further rise of the governor pressure in this branch 242' without affecting governor pressure in line 242 and therefore terminates the decrease in main line pressure with governor pressure. Thus the main line pressure will be decreased proportionately with governor pressure to this point and thereafter maintained at a constant value. Main line pressure is increased by the boost signal line pressure in line 261 which is supplied by the manual selector valve 291 in first ratio operation in first range, neutral and first ratio operation, in reverse range. In these ratio drives and neutral, main line regulator pressure is regulated at a higher value and will similarly decrease with governor pressure until the governor pressure equals main line pressure and thereafter be regulated at a constant value.

In neutral, the manual selector valve 291 supplies main line pressure via main line 234 and ratio change line 283 to the main line pressure regulator booster line 261 and the pitot booster line 260. The other lines are connected to exhaust and thus the three-speed and reverse drive unit 14 is in neutral providing a positive neutral. Main line 283 is also connected via the splitter shift relay valve 301 to the low clutch line 316 for the splitter unit 13 to engage splitter low ratio. The manual selector valve supplies fluid to the booster line 260 which will move pitot control valve element 437 to the left to a discharged position, as shown, and connects line 260 to relay line 441 to move the valve element 456 also to the left or discharged position.

On shifting the manual selector valve 291 to the first range position indicated by 1, main line 283 remains connected to the booster lines 261 and 260 and is connected to the low ratio line 323 to engage low ratio in the three-speed unit 14. Check valve 323' in line 323 provides full flow to low ratio engagement but restricts return flow to retard disengagement. The regulator or trimmer valve 326 controls the pressure supplied to the low ratio motor for gradual engagement as pointed out above, to smoothly start the vehicle in first ratio. At a speed at which sufficient torque multiplication is no longer provided by the torque converter or when the torque converter reaches the coupling phase of operation, governor pressure supplied in line 242 will upshift the lockup shift valve 266 to connect main line 234 via line 270 and the flow control valve 276, which if no ratio shift is occurring at the time, will be opened to supply fluid to the lockup clutch line 271 to engage the lockup clutch 11. At a higher speed, governor pressure supplied by branch 429 will upshift the splitter shift signal valve 416 to supply regulated pressure from the signal pressure regulator valve 401 to the shift signal line 321 to shift the splitter shift relay valve to connect the low ratio line 316 to exhaust 307 and connect the ratio supply line 283 to the high ratio line 314 to engage high ratio in the splitter gear unit. The splitter high pressure supplied by line 314 is also connected to the pitot valve 446 and acts on the valve element 447 to move the valve to the right to discharge a quantity of governor fluid via branch 451 and branch 429. This fluid being retained in these branches momentarily by orifice 450 acts to increase the governor pressure temporarily acting on the splitter signal valve to maintain this valve in the upshift position to prevent hunting. The splitter unit will also downshift on a reduction in speed which reduces governor pressure enough to downshift the splitter shift signal valve 416. The exhaust of high splitter line 314 permits pitot valve 447 to be charged, reducing governor pressure temporarily to insure completion of shift to splitter low. These speed responsive splitter up and downshifts occur in first, second, fourth and reverse ranges. Also, as during all shifts, during this shift the flow control valve 276 will move to the closed position momentarily disengaging the lockup clutch for the duration of the shift and a timed period thereafter.

On a shift of the manual selector valve 291 from first range to second range 2, the booster lines 260 and 261 are vented to exhaust 299 and fluid is supplied to intermediate ratio line 322 which is connected through orifice 322a which regulates the volume of flow in both directions and through check valve 322' which permits full flow to the intermediate motor 152 but only a limited return flow through an aperture in the check valve closure plate to retard disengagement. The pressure supplied to the intermediate motor 152 is initially regulated at a low value and gradually increased by the intermediate regulator valve 325. Prior to this shift as pointed out above, all the pitot valves were in the discharged position. On the exhaust of booster line 260, governor pressure supplied by branch 429 will move the pitot control valve element 437 to the right in a discharge direction to the discharged position connecting intermediate line 322 to the relay line 441. The pitot control valve element 437 will thus move to the right to the charged position tending to reduce the governor pressure in branch 429 acting on the splitter shift signal valve 416 tending to cause a downshift in the splitter unit prior to full engagement of intermediate ratio to avoid a 2-4-3 shift. The governor pressure in line 429 is reduced since booster line 260 exhausts so fast that orifice 450 cannot maintain full governor pressure in lines 429 and 451. The pitot valve element 456 will remain in a discharged position, since rapid movement of pitot control valve element 437 from a discharged to a charged position will prevent substantial discharge of fluid via relay line 441 on the exhaust of booster line 260. An orifice 442 may be used to further reduce this movement but it must be large compared to orifice 450 as explained below. On the downshift of the splitter unit from high to low the pitot valve element 447 will move to the charged position so there is a decrease in governor pressure acting on splitter shift signal valve 416. This governor pressure in lines 451 and 429 is reduced due to the fact that high ratio line 314 can exhaust at a lower pressure and faster rate than governor pressure is supplied via orifice 450 to branch lines 451 and 429 so governor pressure in these branch lines is lower as long as valve 447 is moving. As soon as third ratio is engaged, the increased load slows the engine and reduces governor pressure to normally hold in third ratio, unless the vehicle is moving at a sufficiently high speed to quickly produce an automatic upshift. Normally, on further increase in governor pressure due to increased speed in second range, third ratio, the splitter shift signal valve will be upshifted and provide a third to fourth ratio shift by upshifting from low to high in the splitter unit in the same manner as accomplished in first range.

On movement of the manual selector valve 291 to the third hold position 3, main line pressure from the ratio supply line 283 is connected to high clutch line 311 to engage the high clutch in three-speed unit and to the third hold line 294 which is connected to the chamber 305 of splitter shift valve 301 positively move or position the splitter shift valve in the downshift position shown, connecting the ratio supply line 283 to the splitter low line 316 to engage low ratio in the splitter unit 13 to provide fifth ratio and hold the transmission in fifth ratio regardless of vehicle speed. During this shift the flow valve 276 functions in the same manner to disengage the lockup clutch for the duration of the shift.

On movement of the manual selector valve 291 to the fourth range position 4, illustrated in FIGURE 2b, the ratio supply line 283 is connected only to the high ratio line 311 to engage high in the three-speed unit 14 to provide fifth ratio. If this shift is made from third hold range, the transmission has already been placed in fifth ratio and on exhaust of the fifth ratio hold line 294 the transmission will remain in this ratio until the splitter shift signal valve upshifts in response to speed to upshift the splitter shift relay valve 301 to provide the normal splitter upshift described in range one.

On a shift direct from second range in which the transmission would normally be in fourth ratio to fourth range, the splitter shift signal valve will downshift and place the transmission in fifth ratio. This downshift will be insured by the fact that on venting the intermediate clutch line 322 which previously had been connected through the pitot control valve 436 and line 441 to the pitot valve 455 to hold this valve in discharged position, valve element 456 will be permitted to move to the right to the charged position faster than orifice 450 can replace governor fluid to temporarily reducing governor pressure. Since exhaust via line 441 must be faster than governor fluid flow through orifice 450, it will be seen that orifice 442 in line 441 must be much larger than orifice 450 or may be removed entirely to provide a good governor pressure drop. Thus the splitter unit is downshifted before high is fully engaged to avoid a 4–6–5 shift. Then when splitter high ratio is disengaged, line 314 will be vented permitting the pitot valve 447 to move from the discharged position to the charged position providing a further temporary reduction of governor pressure, as explained above on the 2–3 shift, to momentarily hold the splitter shift signal valve 416 in fourth ratio to prevent hunting. Thereafter, when the governor pressure rises sufficiently to upshift the splitter shift signal valve 416, the splitter unit will be upshifted from low to high ratio and the line 314 will discharge pitot valve 416 to temporarily increase governor pressure to insure completion of and to prevent hunting on this fifth to sixth ratio shift as in the range one first to second ratio shift.

The pitot valve controls are particularly important on a fourth range to second range downshift in order to insure a 5–4 downshift and to avoid a 5–3–4 downshift. In fourth range, fifth ratio, the manual selector valve 291 will supply high clutch line 311 to engage high ratio in the three-speed unit 14 and the splitter shift relay valve will be in a downshift position connecting ratio supply line 283 to the low splitter line 316 to engage low ratio in the splitter unit 13. The pitot control valve 436 will be in the charged position to the right as urged by governor pressure since booster line 260 is exhausted. The pitot valve 447 will be in the charged position shown, since the high splitter ratio line 314 will be exhausted at the splitter shift relay valve 301. The pitot valve 456 will be in the charged position shown, since relay line 441 will be exhausted through the pitot control valve 436 and the intermediate line 322 which is connected to exhaust at the manual valve 291. On the shift to second range, manual selector valve 291 supplies fluid to the intermediate ratio line 322 to engage intermediate ratio in the three-speed unit 14 and supplies fluid through the pitot control valve 436 to the relay line 441 to discharge the pitot valve 455. This pressure acts on a large area of land $b$ to quickly force pitot valve element 456 to the left to discharge a smaller volume of governor fluid at a higher pressure via line 451. Orifice 450 prevents return of any significant volume of this fluid to pitot line 242 thus it is forced via line 429 to the bore 431 between valve element 437 which remains in the discharged position, and acts upon land $d$ of splitter shift signal valve element 417 to force the valve to the upshift position. Thus, the splitter shift relay valve 301 is actuated to the upshift position to insure immediate direction of fluid at main line pressure from the ratio supply line 283 to the splitter high line 314 to engage high ratio in the splitter unit to insure a fifth ratio to fourth ratio shift. After this surge of governor pressure momentarily insuring engagement of fourth ratio, if the governor pressure in line 242 is less, the pressure will equalize across orifice 450 and permit downshifting of the splitter signal valve 417 for a subsequent shift in the splitter unit to low ratio for a 5–4–3 shift.

On a subsequent shift from second range to first range, the pitot valves also insure a third ratio to second ratio shift and prevent a 3–1–2 ratio shift. A manual valve on a second-first range shift vents intermediate line 322 and supplies low line 323 to establish low ratio in three-speed unit 14 and also supplies fluid through the booster line 260 which is connected to the right end of the pitot 436. Since the valve element 437 was in second range in the charged position, supply of booster pressure via line 260 will move valve element 437 to the discharged position momentarily maintaining a higher governor pressure on the land $d$ of the splitter shift signal valve 417 to position this valve in the upshift position. This will cause the splitter shift relay valve 301 to upshift momentarily to provide a third to second ratio shift for a limited period of time, thereafter, a normal two to one downshift may occur. On this movement of the pitot control valve the booster line 260 is connected to relay line 441 to hold the relay valve element 456 in the discharged position it occupied in second range. Thereafter, if the governor pressure is at a value calling for first ratio, a normal 2–1 shift will occur.

On a shift from fourth range to first range, both pitot valves 437 and 456 will operate as above described in the 4–2 range shift and the 2–1 range shift to insure a 5–2 shift. On a shift from neutral to the reverse position, main line pressure via ratio supply line 283 is connected to the reverse line 319 to engage reverse ratio in the three-speed unit 14. Since splitter low ratio is engaged as explained above in neutral, the vehicle will immediately be in reverse drive. Since the booster line 260 was supplied with fluid in neutral and is also supplied in reverse, both the pitot control valve 436 and the pitot valve 455 will be in the discharged position and will remain in this position without affecting the shift. Pitot control valve 447 remains in the charged position. Since the governor pressure increases with the speed of the input shaft to the splitter gear unit 13, governor pressure will be supplied in the same manner in reverse as it was in first ratio forward. When the governor pressure increases sufficiently to upshift the splitter signal valve 416, the shift valve will upshift and control the splitter shift relay valve 301 in the same manner as in first ratio first range to provide an upshift of the splitter gear unit from first ratio reverse to second ratio reverse. The lockup clutch shift valve will also operate to engage direct drive in reverse. The flow valve 276 also functions on shifts in reverse to disengage the lockup shift for the duration of the shift interval.

The above described preferred embodiment is illustrated in the invention and it will be appreciated by those skilled in the art and the modifications may be made in the scope of the appended claims.

We claim:

1. In a transmission, drive means including an input, an output and drive establishing means connecting the input and output and having operating means operative to establish a drive, shift means operatively connected to said operating means having biasing means urging said shift means toward a first position to disestablish said drive, governor means operatively connected to said drive means and said shift means providing a force proportional to the speed of an element of said drive means urging said shift means toward a second position to actuate said operating means to establish said drive, means responsive to the engagement of said drive means connected to said governor means and operative to temporarily increase the force of said governor means operating on said shift means to insure holding said shift means in said second position to insure the completion of the establishment of said drive.

2. In a transmission, drive means including an input, an output and drive establishing means connecting the input and output to establish a ratio drive and having operating means operative to change said drive means for establishing or disestablishing said ratio drive, shift means operatively connected to said operating means having biasing means urging said shift means toward a first position to disestablish said ratio drive, governor means operatively connected to said drive means and said shift means providing a force proportional to the speed of an element of said drive means urging said shift means toward a second position to establish said ratio drive, means responsive to the establishment or disestablishment of said ratio drive means operative to temporarily change the force of said governor means operating on said shift means to insure a proper shift of said shift means.

3. In a transmission, drive means including an input, an output and drive establishing means connecting the input and output and having fluid operated means operative to establish a drive, a source of fluid under pressure, shift valve means connecting said source and fluid operated means having biasing means urging said shift valve means toward a first position to control the supply of fluid from said source to disengage said drive, governor means operatively connected to said drive means providing a fluid pressure proportional to the speed of an element of said drive means and connected to said shift valve means urging said shift valve means toward a second position to control the connection between said source and fluid operated means to establish said drive, means operatively connected to said fluid operated means responsive to the engagement of said drive means and connected to said governor means operative to temporarily increase the force of said governor means operating on said shift valve means to insure holding said shift valve means in said second position to insure the completion of the establishment of said drive.

4. In a transmission, drive means including an input, an output and drive establishing means connecting the input and output and having operating means operative to change said drive by establishing or disestablishing said drive, shift valve means operatively connected to said operating means having biasing means urging said shift valve means toward a first position, governor means operatively connected to said drive means and including a passage and providing a governor pressure proportional to the speed of an element of said drive means operatively connected by said passage to said shift valve means to urge said shift valve means toward a second position to actuate said operating means to establish said drive, an orifice in said governor passage, means connected to said passage between said orifice and shift valve means operative in response to operation of said operating means to change said drive to temporarily change the volume of said passage to temporarily change the pressure value of said governor pressure acting on said shift valve means to insure a proper shift by said shift valve means.

5. In a transmission, drive means including an input, an output and drive establishing means connecting the input and output and having operating means operative to establish a drive, shift valve means operatively connected to said operating means having biasing means urging said shift valve means toward a first position, governor means operatively connected to said drive means and including a passage and providing a governor pressure proportional to the speed of an element of said drive means operatively connected by said passage to said shift valve means to urge said shift valve means toward a second position to actuate said operating means to establish said drive, an orifice in said governor passage, means connected to said passage between said orifice and shift valve means operative in response to the engagement of said drive to temporarily deliver a controlled volume of fluid to said passage to temporarily increase the pressure value of said governor pressure acting on said shift valve means to insure holding said shift valve means in said second position to insure the completion of the establishment of said drive.

6. In a transmission, a drive train including input means, output means and a first and a second drive means connecting said input means in series to said output means, said first drive means having operating means operative to establish a low and a higher drive, said second drive means having operating means operative to establish a low, intermediate and a high drive, first shift valve means operatively connected to said first drive means having biasing means urging said first shift valve means toward a first position to establish said low drive of said first drive means, governor means operatively connected to said drive means and said first shift valve means including a passage supplying governor pressure proportional to the speed of an element of said drive train to said first shift valve means to urge said first shift valve means toward a second position to establish said higher drive, second shift valve means operatively connected to said second drive means and operative in low position to engage low drive of said second drive means, in intermediate position to engage intermediate drive of said second drive and in high position to engage high drive of said drive means, means operatively connected to said second shift valve means and said governor means including a restriction in said passage and a plurality of chambers each having a movable wall connected to said passage between said restriction and said first shift valve means selectively operable in response to particular shift movement of said second shift valve means between said positions to move one or more of said movable walls to temporarily change the pressure value of said governor pressure to a varied degree depending on the shift movement operating on said first shift valve means to insure positioning said first shift valve means in the proper position.

7. In a transmission, a drive train including input means, output means and a first and a second drive means connecting said input means in series to said output means, said first drive means having operating means operative to establish a low and a higher drive, said second drive means having operating means operative to establish a low and a higher drive, first shift valve means operatively connected to said first drive means having biasing means urging said first shift valve means toward a first position to establish said low drive of said first drive means, governor means operatively connected to said drive train and first shift valve means including a passage supplying governor pressure proportional to the speed of an element of said drive train to said first shift valve means to urge said first shift valve means toward a second position to establish said higher drive, second shift

17 valve means operatively connected to said second drive means and operative in low position to engage low drive of said second drive means and in high position to engage higher drive of said drive means, means including a restriction in said passage and chamber means having a movable wall means connected to said passage between said restriction and said first shift valve means operative in response to the movement of said first and second shift valve means from said high position to said low position to move said movable wall to temporarily change the pressure value of said governor pressure operating on said first shift valve means to insure proper positioning said first shift valve means to insure smooth shifts in said drive train on a shift in said second drive means.

8. In a transmission, drive means including an input, an output and drive establishing means connecting the input and output and having fluid operated means operative to establish a drive, a source of fluid under pressure, a shift valve means having a plurality of unbalanced area means each operative on the supply of fluid under pressure to each unbalanced area means to bias said shift valve means in a downshift direction, said shift valve means being operative in an upshift position to connect said source to said fluid operated means, and operative in a downshift position to connect said fluid operated means to exhaust, a source of biasing pressure connected to each of said unbalanced area means when said shift valve means is in said downshift position to bias said shift valve means in a downshift direction, speed responsive means operatively connected to said drive means for operation in response to the speed of an element of said drive means, and operative on said shift valve means to upshift said shift valve means from said downshift position to said upshift position, and said shift valve means when moving from said downshift position toward said upshift position progressively cutting off the supply of fluid to at least two of said unbalanced area means and venting said two unbalanced area means to reduce the biasing force operative on said shift valve means as the shift valve means moves from the downshift to the upshift position.

9. In a transmission, drive means including an input, an output and drive establishing means connecting the input and output and having fluid operated means operative to establish a drive, a source of fluid under pressure, shift valve means having at least three unbalanced area means each operative on the supply of fluid under pressure to each unbalanced area means to bias said shift valve means in a downshift direction, said shift valve means being operative in an upshift position to connect said source to said fluid operated means, and operative in a downshift position to connect said fluid operated means to exhaust, a source of biasing pressure connected to each of said unbalanced area means when said shift valve means is in said downshift position to bias said shift valve means in a downshift direction, speed responsive means operatively connected to said drive means for operation in response to the speed of an element of said drive means operative on said shift valve means to upshift said shift valve means from said downshift position to said upshift position, and said shift valve means when moving from said downshift position toward said upshift position progressively cutting off the supply of fluid to at least two of said unbalanced area means and venting said unbalanced area means to reduce the biasing force operative on said shift valve means as the shift valve means moves from the downshift to the upshift position.

10. In a transmission, drive means including an input, an output and drive establishing means connecting the input and output and having fluid operated means operative to establish a drive, a source of fluid under pressure, shift valve means having a plurality of unbalanced area means each operative on the supply of fluid under pressure to each unbalanced area means to bias said shift valve means in a downshift direction, said shift valve means being operative in an upshift position to connect

18 said source to said fluid operated means to engage said drive, and operative in a downshift position to connect said fluid operated means to exhaust, a source of biasing pressure connected to each of said unbalanced area means when said shift valve means is in said downshift position to bias said shift valve means in a downshift direction, speed responsive means operatively connected to said drive means for operation in response to the speed of an element of said drive means operative on said shift valve means to upshift said shift valve means from said downshift position to said upshift position, and said shift valve means when moving from said downshift position toward said upshift position simultaneously cutting off the supply of fluid to one of said unbalanced area means and venting said one unbalanced area means to reduce the biasing force operative on said shift valve means and connecting said source to said fluid operated means to engage said drive.

11. In a transmission; drive means including an input, an output and drive establishing means connecting the input and output and having operating means operative to establish a drive; shift valve means having a plurality of unbalanced area means each operative on the supply of fluid under pressure to each unbalanced area means to bias said shift valve means in a downshift direction, said shift valve means being operative in an upshift position to actuate said operating means to establish said drive in said drive means, and operative in a downshift position to actuate said operating means to disestablish said drive; a source of biasing pressure connected to each of said unbalanced area means when said shift valve means is in said downshift position to urge said shift valve means to downshift; speed responsive means operatively connected to said drive means for operation in response to the speed of an element of said drive means operative on said shift valve means to upshift said shift valve means from said downshift position to said upshift position; and said shift valve means when moving from said downshift position toward said upshift position progressively cutting off the supply of biasing fluid to at least two of said unbalanced area means and venting said two unbalanced area means consecutively to progressively reduce the biasing force operative on said shift valve means as the shift valve means moves from the downshift to the upshift position.

12. In a transmission, drive means including an input, an output and drive establishing means connecting the input and output and having fluid operated means operative to establish a drive, a first source of fluid under pressure, a first regulator valve operative to regulate the fluid pressure of said first source, a second pressure regulator valve operatively connected with said first source to provide a biasing pressure, a signal shift valve operative to provide a signal pressure in a second position and to vent said signal pressure in a first position and having unbalanced area means operative on the supply of fluid to said unbalanced area means to bias said signal shift valve toward said first position, means connecting said biasing pressure to said unbalanced area to bias said signal shift valve to said first position, speed responsive means operatively connected to said drive means for operation in response to the speed of an element of said drive means and operative on said shift valve to urge said signal shift valve from said first position to said second position, means operative during movement from said first position to said second position reducing the biasing force provided by said biasing pressure with valve movement, said speed responsive means also being connected to said first regulator valve to regulate the pressure of said first source proportional to the speed of said drive means element, a shift relay valve operatively controlled by said signal pressure to in one position connect said first source to said fluid operated means and operative in a second position to connect said fluid operated means to exhaust.

13. In a transmission, drive means including an input, an output and drive establishing means connecting the input and output and having fluid operated means operative to establish a drive, a first source of fluid under pressure, a first regulator valve operative to regulate the fluid pressure of said first source, a second pressure regulator valve operatively connected with said first source to provide a constant biasing pressure, a signal shift valve operative to provide a signal pressure in a second position and to vent said signal pressure in a first position and having a plurality of unbalanced area means each operative on the supply of fluid under pressure to each unbalanced area means to bias said signal shift valve to said first position, means connecting said biasing pressure to said unbalanced areas to bias said signal shift valve to said first position, governor means operatively connected to said drive means for operation in response to the speed of an element of said drive means and operative on said shift valve to urge said signal shift valve from said first position to said second position, said signal shift valve during movement from said first position to said second position cutting off the supply of said biasing pressure to said unbalanced area means progressively in accordance with valve movement, said governor means also being connected to said first regulator valve to regulate the pressure of said first source proportional to the speed of said drive means element, a shift relay valve operatively controlled by said signal pressure to in one position connect said first source to said fluid operated means and operative in a second position to connect said fluid operated means to exhaust.

14. In a transmission, drive means including an input, an output and drive establishing means connecting the input and output and having fluid operated means operative to establish a drive, a first source of fluid under pressure, a first regulator valve operative to regulate the fluid pressure of said first source, a second pressure regulator valve operatively connected with said first source to provide a constant biasing pressure, a signal shift valve operative to provide a signal pressure in a second position and to vent said signal pressure in a first position and having a plurality of unbalanced area means each operative on the supply of fluid under pressure to each unbalanced area means to bias said signal shift valve to said first position, means connecting said biasing pressure to said unbalanced areas to bias said signal shift valve to said first position, governor means operatively connected to said drive means for operation in response to the speed of an element of said drive means and operative on said shift valve to urge said signal shift valve from said first position to said second position, said signal shift valve during movement from said first position to said second position cutting off the supply of said biasing pressure to said unbalanced area means progressively in accordance with valve movement, means operative in response to movement of said signal shift valve to temporarily change the magnitude with which said governor means acts on said signal shift valve to insure completion of said shift, said governor means also being connected to said first regulator valve to regulate the pressure of said first source proportional to the speed of said drive means element, a shift relay valve operatively controlled by said signal pressure to in one position connect said first source to said fluid operated means and operative in a second position to connect said fluid operated means to exhaust.

15. In a transmission, drive means including an input, an output and drive establishing means connecting the input and output and having fluid operated means operative to establish a drive, a first source of fluid under pressure, a first regulator valve operative to regulate the fluid pressure of said first source, a second pressure regulator valve operatively connected with said first source to provide a constant biasing pressure, shift valve means operative to control the supply of fluid from said first source to said fluid operated means to engage said drive in a second position and to disengage said drive in a first position and having unbalanced area means operative on the supply of fluid to said unbalanced area means to bias said shift valve means toward said first position, means connecting said biasing pressure to said unbalanced area means to bias said shift valve means to said first position, governor means operatively connected to said drive means for operation in response to the speed of an element of said drive means and operative on said shift valve to urge said shift valve means from said first position to said second position, said shift valve means including means operative during movement from said first position to said second position to control said biasing pressure to said unbalanced area means to reduce the biasing force progressively in accordance with valve movement, and said governor means also being connected to said first regulator valve to regulate the pressure of said first source proportional to the speed of said drive means element.

16. In a transmission, drive means including an input, an output and drive establishing means connecting the input and output and having fluid operated means operative to establish a drive, a first source of fluid under pressure, a first regulator valve operative to regulate the fluid pressure of said first source, a second pressure regulator valve operatively connected with said first source to provide a constant biasing pressure, shift valve means operative to control the supply of fluid from said first source to said fluid operated means to engage said drive in a second position and to disengage said drive in a first position and having a plurality of unbalanced area means each operative on the supply of fluid under pressure to each unbalanced area means to bias said shift valve means to said first position, means connecting said biasing pressure to said unbalanced areas to bias said shift valve means to said first position, governor means operatively connected to said drive means for operation in response to the speed of an element of said drive means and operative on said shift valve to urge said shift valve means from said first position to said second position, said shift valve means during movement from said first position to said second position cutting off the supply of said biasing pressure to said unbalanced areas progressively in accordance with valve movement, and said governor means also being connected to said first regulator valve to regulate the pressure of said first source proportional to the speed of said drive means element.

17. In a transmission, a drive train including input means, output means and a first and a second drive means connecting said input means in series to said output means, said first drive means having fluid operated means operative to establish a low and a higher drive, said second drive means having operating means operative to establish a low and a higher drive, a souce of fluid under pressure, first shift valve means operatively connecting said source to said first drive means in a second position and connecting said fluid operated means to exhausting in a first position having biasing means urging said shift valve means toward a first position to establish said low drive in said first drive means, governor means operatively connected to an element of said drive train providing a force proportional to speed connected to said first shift valve means urging said first shift valve means toward a second position to establish said higher drive, second shift valve means operatively connecting said source to said second drive means and operative in low position to engage low drive of said first drive means and in high position to engage said higher drive of said second drive means, means responsive to the movement of said first and second shift valve means between said high position and said low position operative to temporarily change the force of said governor means operating on said first shift valve means to insure positioning said first shift valve means in the proper position to insure a smooth change of drive in said first drive means on a shift in said second drive means.

18. In a transmission, a drive train including input means, output means and a first and a second drive means connecting said input means in series to said output means, said first drive means having fluid operated means operative to establish a low and a higher drive, said second drive means having operating means operative to establish a low and a higher drive, a source of fluid under pressure, first shift valve means operatively connecting said source to said first drive means in a second position and connecting said fluid operated means to exhausting in a first position having biasing means urging said shift valve means toward a first position to establish said low drive in said first drive means, governor means operatively connected to an element of said drive train providing a force proportional to speed connected to said first shift valve means urging said first shift valve means toward a second position to establish said higher drive, second shift valve means operatively connecting said source to said second drive means and operative in low position to engage low drive of said first drive means and in high position to engage said higher drive of said second drive means, means responsive to upshift said first shift valve means and downshift movement of said second shift valve means operative to temporarily increase the force of said governor means operating on said first shift valve means to insure positioning said first shift valve means in the proper position to insure a smooth change of drive in said first drive means on a shift in said first and second drive means.

19. In a transmission, drive means including input and output and drive establishing means connecting the input and output to establish a ratio drive and having operating means operative to change said drive means for establishing or disestablishing said ratio drive, shift means operatively connected to said operating means having biasing means urging said shift means toward a first position to disestablish said ratio drive, governor means operatively connected to an element of said drive means and said shift means providing a force proportional to speed urging said shift means toward a second position to establish said ratio drive, means responsive to movement of said shift means for the establishment or disestablishment of said ratio drive means operative to temporarily change the force of said governor means operating on said shift means to insure a proper shift of said shift means.

References Cited in the file of this patent
UNITED STATES PATENTS

| | | |
|---|---|---|
| 2,757,552 | English | Aug. 7, 1956 |
| 2,896,468 | Cheek et al. | July 28, 1959 |
| 3,053,116 | Christenson et al. | Sept. 11, 1962 |